United States Patent [19]

Sawazaki et al.

[11] 3,873,994

[45] Mar. 25, 1975

[54] MAGNETIC RECORDING AND REPRODUCING APPARATUS WITH GROOVED RECORDING MEDIUM AND TRACKING GUIDE

[75] Inventors: Norikazu Sawazaki, Yokohama; Mamoru Kuriyagawa, Kamakura; Motoi Yagi, Zushi, all of Japan

[73] Assignee: Tokyo Shibaura Electric Co., Ltd., Kawasaki-shi, Japan

[22] Filed: Feb. 28, 1973

[21] Appl. No.: 336,487

[30] Foreign Application Priority Data

Mar. 3, 1972 Japan ............................... 47-21447

[52] U.S. Cl. .................. 360/130, 360/122, 360/134

[51] Int. Cl. ...... G11b 15/60, G11b 5/22, G11b 5/78

[58] Field of Search ............. 360/122, 130, 81–100, 360/134

[56] References Cited

UNITED STATES PATENTS

| | | | |
|---|---|---|---|
| 2,428,701 | 10/1947 | Eilenberger | 360/122 |
| 2,594,893 | 4/1952 | Faus | 360/86 |
| 3,255,307 | 6/1966 | Schuller | 360/130 |

*Primary Examiner*—Bernard Konick
*Assistant Examiner*—Robert S. Tupper
*Attorney, Agent, or Firm*—Flynn & Frishauf

[57] ABSTRACT

A recording reproducing apparatus comprises a tracking guide consisting of a non-magnetic curvature body having a plurality of projection streaks to be engaged with a plurality of parallel grooves provided in a magnetic film surface of a magnetic tape, and a magnetic head constituting part of the projection streak.

5 Claims, 18 Drawing Figures

MAGNETIC RECORDING AND REPRODUCING APPARATUS WITH GROOVED RECORDING MEDIUM AND TRACKING GUIDE

This invention relates to a recording reproducing apparatus using a tracking guide for relatively guiding a transducer particularly along the grooves of a recording medium.

Means for recording signals in a groove of a recording medium and reproducing the signal by stylus-tracking along the groove of the recording medium is heretofore known as a gramophone. Recently it has been made public to utilize this principle as recording and reproducing video signals to and from a recording medium. With conventional apparatus, however, tracking is effected by guiding a single pickup or tracking stylus of a transducer along a groove of a recording medium. In such a tracking method, the transducer having a single pickup or tracking stylus to be engaged with the groove of the recording medium is required to be very light in weight. That is, the transducer, when its pickup or tracking stylus is slidably guided at a rapid speed along the groove of the recording medium, receives a force from the walls of the groove to move in a direction orthogonal to the groove of the recording medium. If a weighty transducer is used, it is difficult to follow such movement and thus no sufficient tracking can be effected. Difficulty is also presented in cases where use is made as a transducer of a weighty, large-sized device such as a magnetic head, where a transducer is travelled, at a rapid speed, relatively along the groove of the recording medium, or where the groove is narrower in its dimension. Particularly when a rapid tracking, such as reproducing of video signals is necessary, it is difficult or impossible to adopt the conventional tracking method.

An object of this invention is to provide a recording reproducing apparatus capable of easily effecting proper tracking even if a relatively weighty transducer is employed, and capable of assuring such tracking even if a relatively rapid speed is involved between a recording medium and a transducer.

A further object of this invention is to provide a recording reproducing apparatus capable of assuring stable reproduction even when a rapid tracking is effected using a weighty transducer having a plurality of projection streaks to be slidably guided along plural grooves of a recording medium.

SUMMARY OF THE INVENTION

According to one aspect of this invention there is provided a recording reproducing apparatus comprising a recording medium having a plurality of juxtaposed grooves, a tracking guide having projection streaks engaging with the grooves of the recording medium, a transducer mounted to the tracking guide and adapted to record and detect signals to and from the recording medium, and means for relatively moving the recording medium and the tracking guide to permit the tracking guide to travel along the grooves of the recording medium.

This invention can be more fully understood from the following detailed description when taken in connection with the accompanying drawings, in which.

Figure 1:
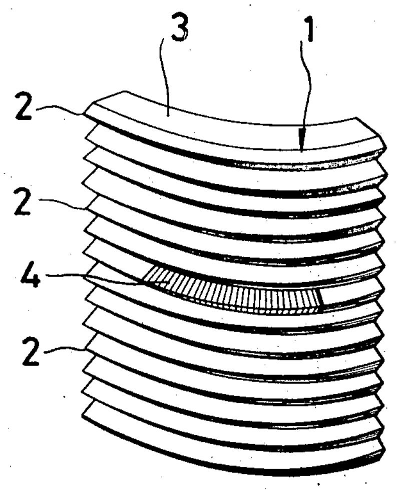
FIG. 1 is a perspective view showing a tracking guide according to one embodiment of this invention.
Figure 2:
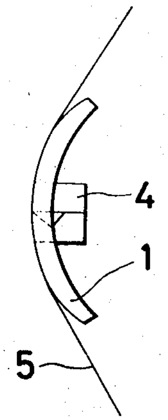
FIG. 2 is a top view showing the manner in which a magnetic tape is travelled around the tracking guide of FIG. 1.

Referring to FIG. 1, there is shown a tracking guide 1 consisting of a non-magnetic curvature body 3 having a plurality of projection streaks 2. The projection streaks 2 have substantially the same pitch with respect to each other. Substantially at the center of the curvature body 3 a magnetic head 4 constituting part of the projection streak 2 is integrally provided in substantially the same shape as the projection streak 2. On the projection streak 2 of the tracking guide 1 a magnetic tape 5 is travelled in a manner shown in FIGS. 2 to 4. At that side of the magnetic tape 5 contacted with the magnetic head i.e. on that side of the magnetic tape 5 coated with a magnetic film (not shown) there is provided a plurality of grooves 6 associated with the projection streaks 2. The pitch of the grooves 6 may have the same as, or an integral multiple of, the pitch of the projection streaks 2 of the tracking guide 1.

With such an arrangement, when the magnetic tape 5 is travelled in its longitudinal direction the recording and reproducing of signals onto and from the magnetic tape 5 are effected through the magnetic head 4. During the travel of the magnetic tape 5 the groove 6 of the magnetic tape 5 is engaged with the projection streaks 2 of the tracking guide 1 to effectively prevent a lateral movement of the magnetic tape 5, so that a stable travelling of the tape 5 is assured.

Figure 5:
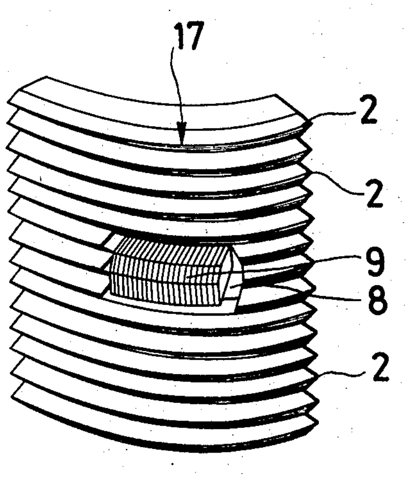
FIG. 5 is a perspective view showing a tracking guide according to another embodiment of this invention.

In FIG. 5 a tracking guide 7 formed in the same manner as that of FIG. 1 is provided with a through bore 8 into which a magnetic head 9 is provided. The magnetic head 9 whose top end corresponds to one of the projection streaks 2 is elevated or raised within the through bore 8. When the magnetic head 9 is urged onto the magnetic tape 5 by a spring (not shown), it can be engaged with the tape 5 under a constant pressure even if the magnetic head 9 is worn thin.

In a case where an endless tape 5 is used, an arrangement is such that the groove of the tape 5 is displaced one pitch, in a direction of a tape width, for each rotation of the tape 5 and the tracking guide 1 or 7 is movable in the direction of the tape width. This arrangement prevents the tape 5 from being moved in a direction of the tape width. Since the tracking guide 1 or 7 is moved in the direction of the tape width, a stable tracking can be assured. In this way, the movement of the tracking guide having the magnetic head in the direction of the tape width can be effected, in a known method, using a simple cam mechanism in interlock with a capstan for tape travelling.

Figure 3:
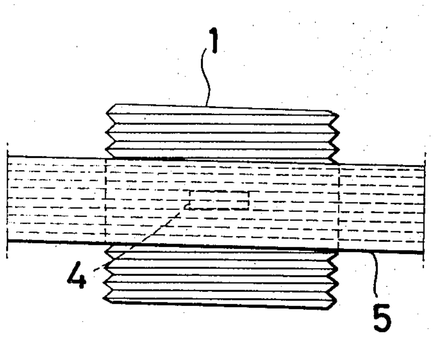
FIG. 3 is a front view of FIG. 2.
Figure 4:
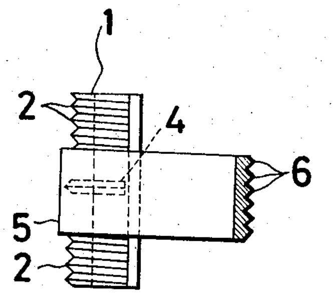
FIG. 4 is a side view of FIG. 2.

The dimension of the tracking guide 1 taken in the direction of the tape width is set to be, for example, more than two times the width of the tape as shown in FIGS. 3 and 4. Since the magnetic head 4 is provided substantially at the center of the tracking guide 1 it can be engaged with the magnetic tape 5 over the whole width thereof, even if the tape 5 is displaced in the direction of the tape width, so that a stable tracking is always assured. Furthermore, in a case where the tracking guide 1 can be moved, in the direction of the tape width, for example, only under forces received from the grooves 6 of the tape 5, it can readily be moved, in the direction of the tape width, with the movement of the tape 5 without the necessity of using any special cam mechanism etc. If the tracking guide 1 is fixed on the other hand, the tape 5 is moved pitch by pitch, in the direction of the tape width, in a manner to be guided by the tracking guide 1.

Referring now to FIGS. 6 to 10 there is shown an embodiment in which this invention is applied to a rotary magnetic head using, for example, a video tape recorder.

Figure 6:
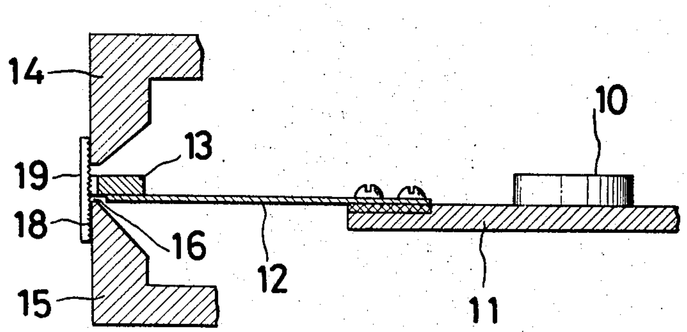
FIG. 6 is a cross sectional view showing a tape guide and a rotating head portion of another recording reproducing apparatus according to another embodiment of this invention.
Figure 7:
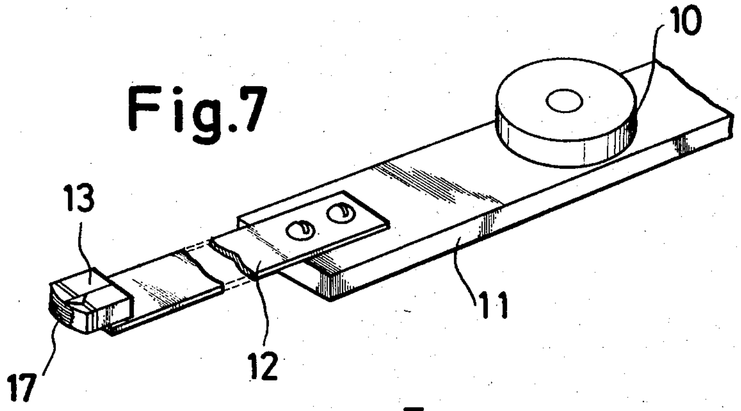
FIG. 7 is a perspective view showing the rotating head portion of FIG. 6.

In FIG. 6 a resilient support plate 12 is fastened on the top surface of a rotary base 11 mounted to a rotating shaft 10. A magnetic head 13 is mounted at the forward end of the support plate 12. The magnetic head 13 is moved, with the rotation of the rotating shaft 10, within a clearance defined between coaxially mounted upper and lower cylinders 14 and 15 of a tape guide. The use of the resilient support plate 12 permits the magnetic head 13 to be moved freely in a direction of a tape width. At the forward end of the magnetic head 13 a plurality of projection streaks 17 are provided in a direction of rotation as shown in FIG. 7. A magnetic tape 19 having grooves 18 to be engaged with the projection streaks 17 of the magnetic head 13 is travelled along the clearance 16 in a manner to span the upper and lower cylinders 14 and 15 of the tape guide as shown in FIG. 6.

Figure 8:
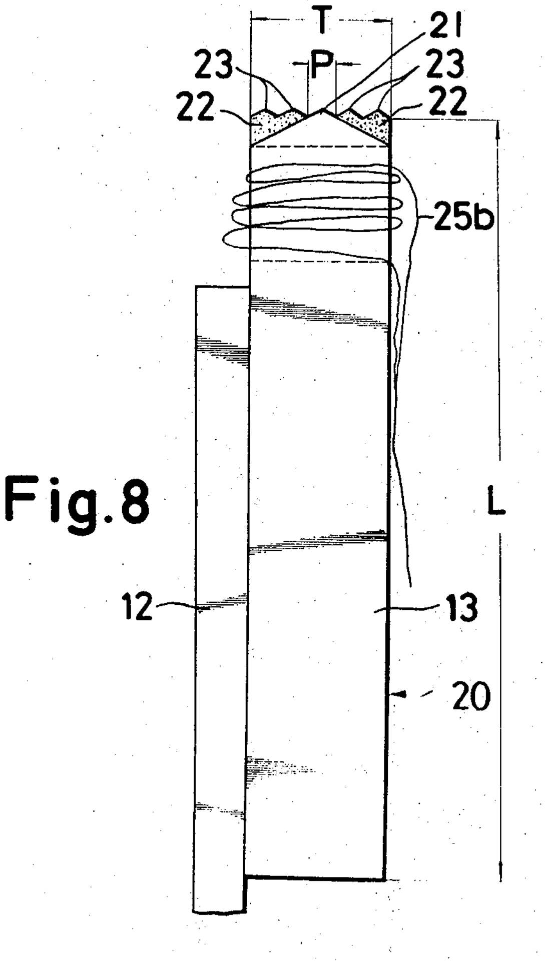
FIG. 8 is an enlarged side view of the magnetic head of FIG. 7.
Figure 9:
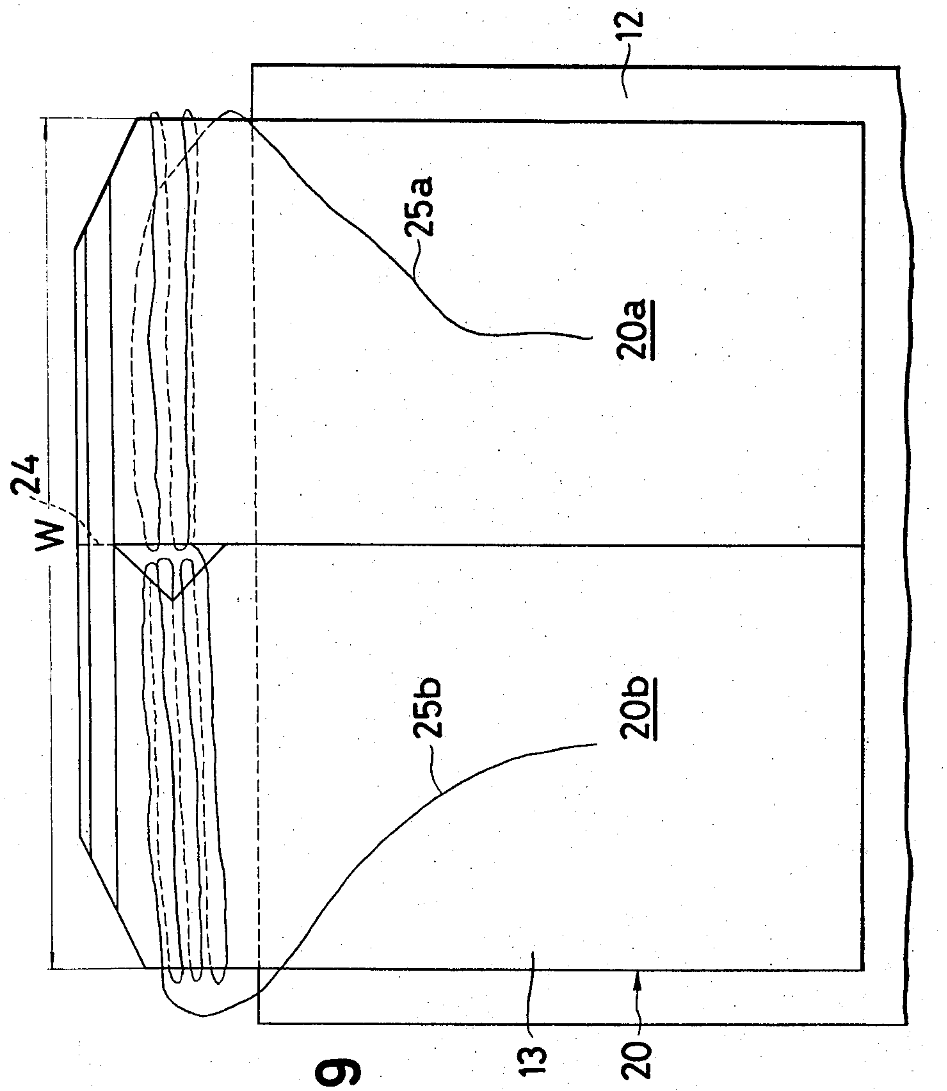
FIG. 9 is an enlarged plan view of the magnetic head of FIG. 8.

As shown in FIGS. 8 and 9, the magnetic head 13 has an angular projection streak 21 constituting a head effective surface and projecting at its forward end of the magnetic core 20 towards the contact surface of the tape 19. On both sides of the projection streak 21 constituting the head effective surface there are provided tracking guides 22 made of a non-magnetic material such as glass, etc. On the tracking guide 22 are provided a plurality of projection streaks 23, in this case, four, whose pitch is the same as, or an integral multiple of, the groove 18 of the tape 19. The projection streak 23 and the angular projection streak 21 are arranged substantially over the width W of the magnetic head 13 as shown in FIG. 9. As a whole, substantially the same tracking guide 22 as shown in FIG. 1 is constructed. In FIGS. 8 and 9, the magnetic core 20 is divided by a head gap 24 into two core pieces **20*a* and 20*b* around which coils 25*a* and 25*b*** are wound.

Figure 10:
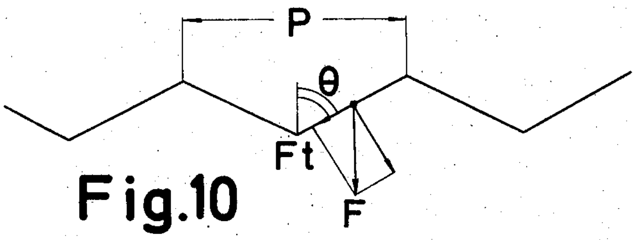
FIG. 10 is a line representation explaining the action of projection streaks of the magnetic head of FIG. 8.

Let us now numerically explain the tracking operation. With the magnetic head 13 shown in FIGS. 8 and 9, suppose that the length L and width W, and the thickness T of the magnetic head 13 are 15mm and 0.25mm respectively. Then the width P of the projection streak 21 and width of the projection streak 23 will all be 0.05mm, and the weight of the head 13 including the weight of the support plate 12 will be of the order of 5mg altogether. In FIG. 10, if the inclination $\theta$ of the groove having a pitch P is, for example 60° a tracking component Ft produced in the groove surface by a tape contact pressure F1 will be $$Ft = F \cos \theta = F/2$$

With a normal contact force between the tape and the magnetic head represented by 5g weight a tracking force will be 2.5g weight and a time required to track the groove one pitch P (0.05mm) will be of the order of about 0.1m sec. Thus, no problem is presented from the practical viewpoint. In this case, if the head 13 is made compact and light in weight, then an easier tracking will result.

Figure 11:
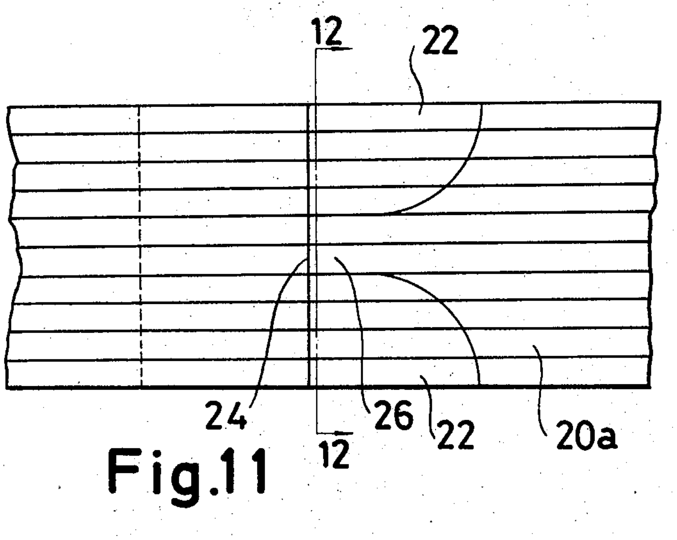
FIG. 11 is an enlarged front view showing another magnetic head.
Figure 12:
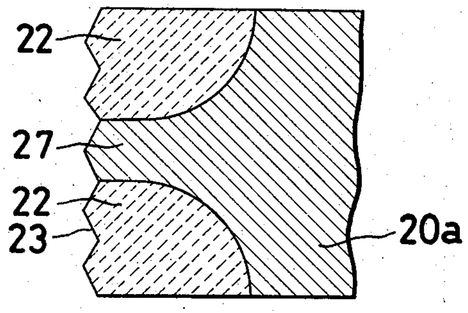
FIG. 12 is a cross sectional view taken along line 12—12 of FIG. 11.
Figure 13:
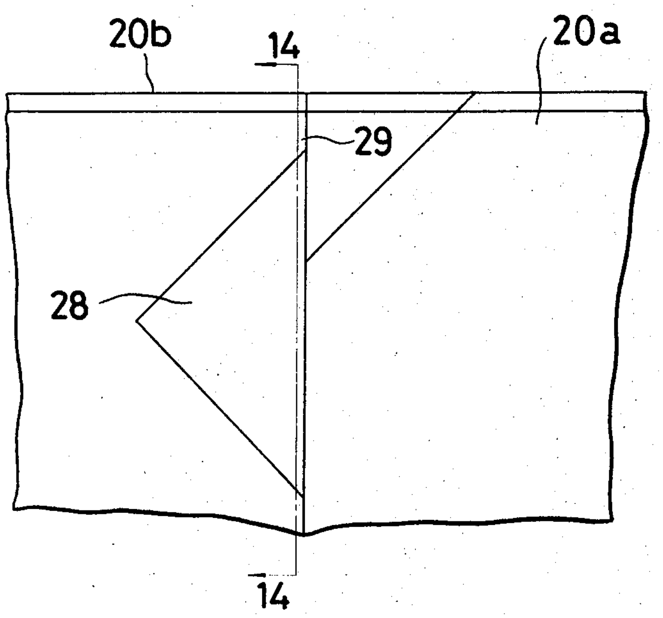
FIG. 13 is a plan view showing the magnetic head of FIG. 11.
Figure 14:
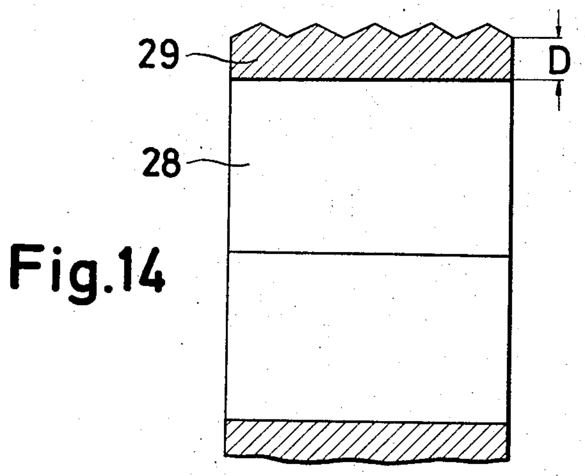
FIG. 14 is a cross sectional view taken along line 14—14 of FIG. 13.
Figure 15:
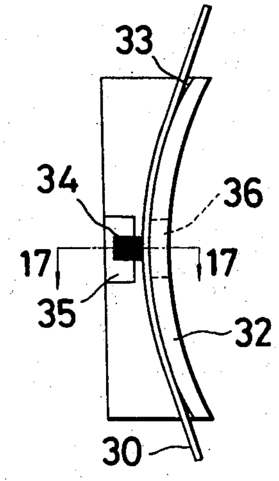
FIG. 15 is a top view showing a tracking guide according to another embodiment of this invention.
Figure 16:
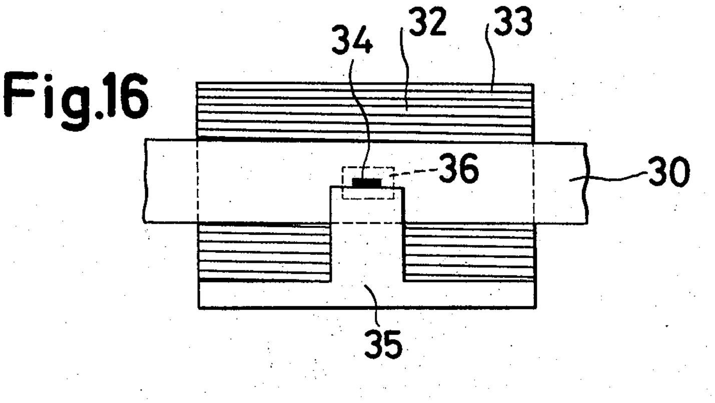
FIG. 16 is a front view showing a tracking guide of FIG. 15.
Figure 17:
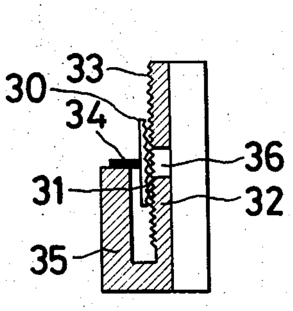
FIG. 17 is a cross sectional view taken along line 17—17 of FIG. 15.

FIGS. 11 to 14 show an improvement over the magnetic head 13 shown in FIGS. 8 and 9 in which a similar reference numeral is used to designate similar parts or elements. FIG. 11 is a view taken from a tape contact surface. The forward end 26 of a right side core piece **20*a* has a width corresponding to that of the groove of the tape. On both sides of the forward end 26 are provided tracking guides 22 having projection streaks 23 made of a non-magnetic material such as glass. The right side core piece 20*a* has a head gap forming portion 27 extending in a direction perpendicular to that of the travelling of the tape and corresponding in width to the groove of the tape as shown in FIG. 12. A left side core piece 20*b* has a cutout 28, as shown in FIG. 13, in which a coil is wound. The width D of a head gap forming portion 29 is properly set as shown in FIG. 14. With such a structure, unless the gap forming portion 29 of the core piece 20*b* in FIG. 14 is worn, by friction against the tape, up to a predetermined dimension a head gap can be provided between the gap forming portion 29 of the core piece 20*b* and the gap forming portion 27 of the core piece a. Thus, a stable recording or reproduction can be assured over a longer period of time. The above embodiments are designed to track a magnetic tape having grooves in its magnetic recording surface, but grooves may be provided on a surface opposite to the magnetic recording surface of the tape to permit the groove to be engaged with the projection streaks of the tracking guide as shown in FIGS. 15 to 17. In this case, the groove 31 formed in the surface opposite to the magnetic recording surface of the tape 30 is engaged with the projection streaks 23, and the magnetic tape 30 is travelled relative to the tracking guide 32 in a manner to permit the magnetic recording surface of the tape 30 to be engaged with a magnetic head 34. The magnetic head 34 is suitably supported by a support 35 formed integral with the tracking guide 32. A through bore 36 is provided in that portion of the tracking guide 32** oppositely facing a magnetic head 34. The presence of the through bore 36 permits the tape 30 to be slidably moved in a manner to be contacted with a head 34 in a stable fashion.

Figure 18:
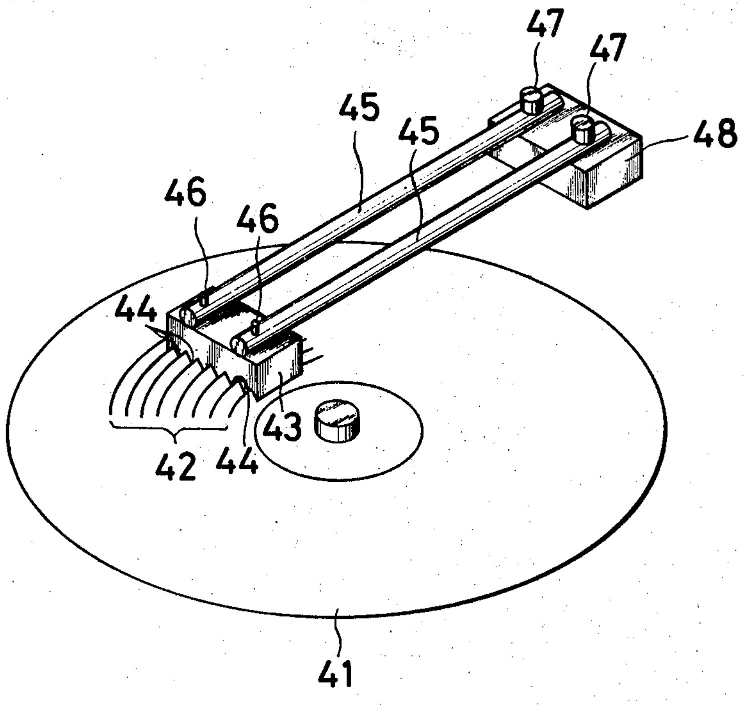
FIG. 18 is a perspective view showing another embodiment of this invention.

In a case where this invention is applied to a disk-like recording medium the recording and reproducing of signals to and from a magnetic tape can be effected through the use of a conventional pickup arm for gramophones as shown in FIG. 18. In FIG. 18, 41 shows a disk-like recording medium in the surface of which are provided grooves 42. Along the grooves 42 of the disk-like recording medium 41 plural projection streaks 44 of a tracking guide 43 are guided. A magnetic film, not shown, is coated in the grooves 42 of the recording medium 41.

To the tracking guide 43 two arms 45 are pivotally mounted by pins 46, and the other ends of the two arms 45 are pivotally mounted by pins 47 to a base block 48, respectively. Such a pickup arm structure is known as a parallel moving type arm and it is possible to maintain the projection 44 of the tracking guide 43 always substantially parallel to the groove 42 of the recording medium 41. A transducer, not shown, is mounted on the side having the projection streaks 44, for example, in the same manner as shown in FIG. 1.

Where the disk 41 is employed for recording or reproducing video signals it is heretofore impossible to use a guide having a single projection streak relative to the groove of the disk since the width of the groove of the disk is, in general, reduced to a small magnitude of several microns for increasing its recording density and thus the tracking guide merely receives a small magnitude of force from the groove of the disk. According to this invention, however, it can be easily put to practice.

Though use is made of the magnetic disk 41 in FIG. 18, indentions may be provided, according to signals, in a spiral groove as shown, for example, in the Japanese Patent Publication No. 12,948/72, so that tracking can be effected by a transducer using a piezoelectric element.

According to this invention a transducer can receive through a tracking guide, forces from plural grooves of the disk at the same time. Even if a weighty transducer is employed it is still possible to effect a sufficient tracking. It is very effective to apply this transducer particularly to a rotary head video tape recorder including a magnetic head. A more advantage is obtained if it is applied to a fixed head type tape recorder. In this case, the use of a weighty, large sized head will present no problem, since a transducer can be fixed.

When an endless tape is used, there has been encountered a drawback that tracking is displaced at the seam of a tape. According to this invention, however, no tracking displacement takes place in any way. Since a stable tracking can be attained it is possible to enhance a recording density to a greater extent. Furthermore, the recording or reproducing of video signals can effectively be made with the result that a well defined picture image can be obtained. In another aspect of this invention it is possible to lengthen the service life of a recording medium and transducer. Where tracking is effected using a single projection it is heretofore necessary to urge the tracking stylus strongly into the groove of a recording medium, since a tracking displacement is easily caused due to a slight force received from the groove. According to this invention a tracking guide receives forces from the plural grooves of a recording medium. As a result, a far slighter urging force is only necessary per one groove and the rate of wear can be reduced to a greater extent. In a case where a head constitutes part of the projection streaks of a tracking guide, the remaining projection streaks of the tracking guide function as a head protector.

Though the magnetic head is used as a transducer this invention is not restricted to this usage and is equally applicable, for example, to a combination of a record stylus with an electromechanical transducing element such as a piezoelectric element, or to a non-contact type transducer such as a photoelectric transducing element.

With the above embodiments the grooves are provided in the recording medium while the projection streaks are provided on the tracking guide. However, the reverse may also be put into practice. The projection streaks may be in the form of a short record stylus.

What we claim is:

1. A magnetic recording and reproducing apparatus comprising:

an elongated tape-shaped magnetic recording medium having a surface provided with a magnetic recording plane, and a plurality of juxtaposed grooves formed on a surface opposite to said surface which is provided with said magnetic recording plane, said grooves being directed in the longitudinal direction of said tape-shaped recording medium;

a tracking guide having a plurality of projections engaging with said grooves;

a magnetic head;

supporting means integrated with said tracking guide for supporting said magnetic head so that said magnetic head is in contact with said magnetic recording plane; and means for moving said recording medium relative to said tracking guide so that said projections of said tracking guide travel along said grooves of said recording medium.

2. A magnetic recording and reproducing apparatus according to claim 1, wherein said tracking guide is fabricated of non-magnetic material.

3. A magnetic recording and reproducing apparatus according to claim 1, wherein said tracking guide is provided with a recessed hole at the portion thereof opposite to said magnetic head.

4. A magnetic recording and reproducing apparatus according to claim 3, wherein said tracking guide has a convex surface on which said projections are formed and which projects in the direction of said magnetic head supported on said supporting means.

5. A magnetic recording and reproducing apparatus according to claim 4, wherein said supporting means includes an L-shaped supporting arm extending from the bottom portion of said convex surface of said tracking guide.

* * * * *